(12) United States Patent
Numata et al.

(10) Patent No.: US 8,704,901 B2
(45) Date of Patent: Apr. 22, 2014

(54) IMAGE PROCESSING DEVICE AND IMAGE PROCESSING METHOD

(75) Inventors: Satoshi Numata, Tokyo (JP); Nobuyuki Matsushita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/312,227

(22) Filed: Dec. 6, 2011

(65) Prior Publication Data

US 2012/0169894 A1 Jul. 5, 2012

(30) Foreign Application Priority Data

Jan. 5, 2011 (JP) ................................. 2011-000348

(51) Int. Cl.
*H04N 5/228* (2006.01)
(52) U.S. Cl.
USPC ................. 348/208.99; 348/208.6; 348/222.1
(58) Field of Classification Search
USPC ................................ 348/222.1, 241–251, 342
See application file for complete search history.

(56) References Cited

U.S. PATENT DOCUMENTS

| 2008/0144960 A1* | 6/2008 | Watarai | 382/260 |
| 2008/0174663 A1* | 7/2008 | Iwabuchi | 348/208.6 |
| 2010/0091184 A1* | 4/2010 | Nitta | 348/448 |
| 2010/0157110 A1* | 6/2010 | Hatanaka et al. | 348/241 |
| 2011/0019082 A1* | 1/2011 | Su et al. | 348/441 |
| 2011/0149106 A1* | 6/2011 | Kino | 348/222.1 |

FOREIGN PATENT DOCUMENTS

JP   2009-81596   4/2009

OTHER PUBLICATIONS

U.S. Appl. No. 13/312,187, filed Dec. 6, 2011, Numata.
U.S. Appl. No. 13/312,085, filed Dec. 6, 2011, Numata, et al.
U.S. Appl. No. 13/309,774, filed Dec. 2, 2011, Numata, et al.

* cited by examiner

*Primary Examiner* — Timothy J Henn
*Assistant Examiner* — Pritham Prabhakher
(74) *Attorney, Agent, or Firm* — Sony Corporation

(57) ABSTRACT

There is provided an image processing device including a motion compensation section which compensates motion between a target image and a reference image, an image compositing section which generates a composited image by compositing the target image and the reference image, the motion therebetween having been compensated, and a spatial filtering section which performs spatial filtering of the composited image. The spatial filtering section may perform spatial filtering of the composited image by using an ε-filter.

17 Claims, 12 Drawing Sheets

IMAGE PROCESSING DEVICE AND IMAGE PROCESSING METHOD

BACKGROUND

The present disclosure relates to an image processing device and an image processing method, and particularly to an image processing device and an image processing method which reduce noise included in an image.

In shooting an image, there is known technology for obtaining an image with reduced noise by compositing successively-shot multiple images (frames). For example, in the case where, on an image to be processed (target image), multiple images (reference images) are composited, which are shot successively before or after the shooting of the target image and are aligned by motion estimation and motion compensation, images which are almost the same as each other are integrated in a time direction. Accordingly, the noise randomly included in each image is cancelled out, and hence is reduced as a result. Hereinafter, the noise reduction (NR) achieved by such a method is referred to as frame NR.

As an advantage of the frame NR, there is that the noise can be reduced regardless of a spatial frequency. For example, in the NR using a spatial filter, it is difficult to distinguish noise of a high-frequency component from an edge of a subject-of-shooting. In contrast, in the frame NR, the noise of a high-frequency component can be reduced while keeping the edge of the subject-of-shooting (for example, refer to JP 2009-81596A).

SUMMARY

However, all the noise included in an image is not necessarily the random noise. For example, of the noise, there is also noise included as a fixed pattern in each image due to bias in sensor characteristics or lens characteristics. Such fixed patterned noise is not cancelled out even if each image is integrated in the time direction, and is therefore difficult to be reduced with the frame NR.

In light of the foregoing, it is desirable to provide an image processing device and an image processing method, which are novel and improved, and which are capable of enhancing effects of noise reduction processing performed by compositing images.

According to an embodiment of the present disclosure, there is provided an image processing device which includes a motion compensation section which compensates motion between a target image and a reference image, an image compositing section which generates a composited image by compositing the target image and the reference image, the motion therebetween having been compensated, and a spatial filtering section which performs spatial filtering of the composited image.

The spatial filtering section may perform spatial filtering of the composited image by using an $\epsilon$-filter.

The spatial filtering section may reduce the composited image and perform spatial filtering.

An image signal of the composited image may be an image signal including a luminance component and a color-difference component, and the spatial filtering section may perform spatial filtering of the color-difference component.

An image signal of the target image and an image signal of the reference image may each be an image signal including a luminance component and a color-difference component.

According to another embodiment of the present disclosure, there is provided an image processing method which includes compensating motion between a target image and a reference image, generating a composited image by compositing the target image and the reference image, the motion therebetween having been compensated, and performing spatial filtering of the composited image.

According to the embodiments of the present disclosure described above, the effects of noise reduction processing performed by compositing images can be enhanced.

DETAILED DESCRIPTION OF THE EMBODIMENT(S)

Figure 1:
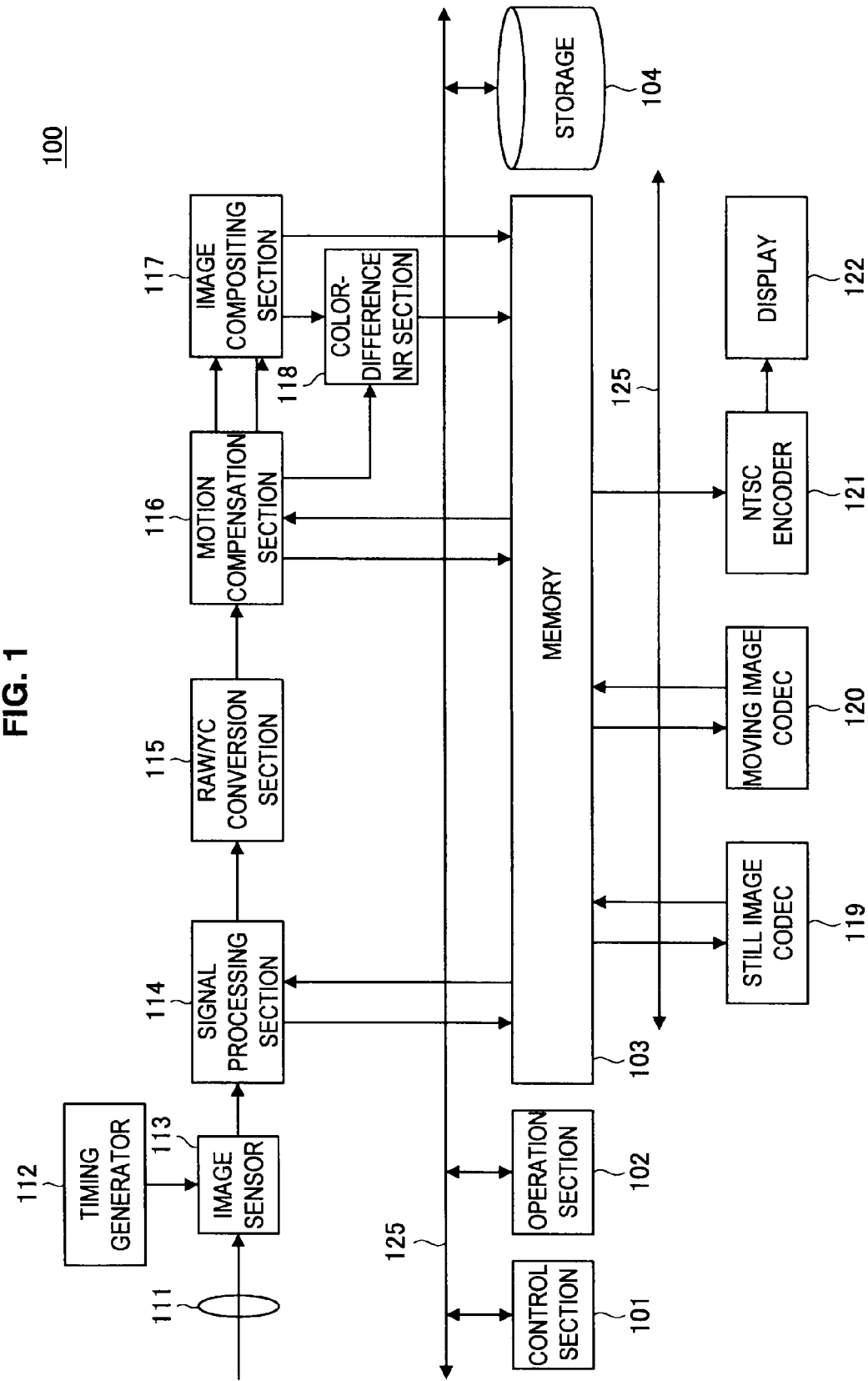
FIG. 1 is a block diagram showing a functional configuration of an imaging device according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. First embodiment
 1-1. Overall configuration of imaging device
 1-2. About frame NR processing
 1-3. Details of frame NR processing and color-difference NR processing
2. Second embodiment
3. Summary

1. First Embodiment

1-1. Overall Configuration of Imaging Device

First, a configuration of an imaging device according to a first embodiment of the present disclosure will be described. In the first embodiment of the present disclosure, an image processing device is represented by an imaging device, an addition section is represented by an image compositing section, and a spatial filtering section is represented by a color-difference NR section.

FIG. 1 is a block diagram showing a functional configuration of an imaging device 100 according to the first embodiment of the present disclosure. The imaging device 100 has a function of capturing a still image or a moving image and recording the captured still image or moving image in a recording medium as digital image data. The imaging device 100 may be any electronic device such as a digital camera.

Referring to FIG. 1, the imaging device 100 includes a control section 101, an operation section 102, a memory 103, a storage 104, an imaging optical system 111, a timing generator 112, an image sensor 113, a signal processing section 114, an RAW/YC conversion section 115, a motion compensation section 116, an image compositing section 117, a color-difference NR section 118, a still image codec 119, a moving image codec 120, an NTSC encoder 121, and a display 122. Those respective structural elements are connected to one another via a system bus 125.

The control section 101 controls operation of each section of the imaging device 100. The control section 101 may be a CPU (Central Processing Unit) which operates based on a program stored in the memory 103 and thereby executing various types of arithmetic processing necessary for the control. The control section 101 may use the memory 103 as a temporary storage area for the arithmetic processing. Note that the program used for the control section 101 to operate may be a program that is written in the memory 103 in advance, or may be a program that is provided to the imaging device 100 by being stored in a disk-like recording medium or a removable storage medium such as a memory card. Further, the program used for the control section 101 to operate may be downloaded to the imaging device 100 via a network such as a LAN (Local Area Network) or the Internet.

The operation section 102 functions as a user interface for operating the imaging device 100. The operation section 102 may be, for example, an operation button such as a shutter button, which is provided on the exterior of the imaging device 100, a touch panel, or a remote controller. The operation section 102 may, based on an operation performed by a user, output to the control section 101 an operation signal for activation and stop of the imaging device 100, start and end of shooting a still image or a moving image, settings of various types of functions of the imaging device 100, or the like.

In the memory 103, data on processing of the imaging device 100 may be stored. The memory 103 may be, for example, a semiconductor memory such as a flash ROM (Read Only Memory) or a DRAM (Dynamic Random Access Memory). In the memory 103, for example, a program used by the control section 101 and an image signal processed by an image processing function are temporarily or continuously stored. The image signal stored in the memory 103 may be, for example, a target image and a reference image of a base frame and a reduced frame, and an NR image, to be described below.

In the storage 104, an image shot by the imaging device 100 is stored as image data. The storage 104 may be, for example, a semiconductor memory such as a flash ROM, an optical disc such as a BD (Blu-ray Disc), a DVD (Digital Versatile Disc), or a CD (Compact Disc), or a hard disk. The storage 104 may also be a storage device built into the imaging device 100, or be a removable medium such as a memory card that is detachable to and from the imaging device 100.

The imaging optical system 111 is formed of various types of lenses such as a focus lens and a zoom lens, and optical components such as an optical filter and a diaphragm. An optical image (image of subject-of-shooting) entered from the subject-of-shooting is formed into an image on an exposure surface of the image sensor 113 via each optical component of the imaging optical system 111.

The timing generator 112 generates, in accordance with an instruction given by the control section 101, various types of pulses such as a four-phase pulse and a field shift pulse for vertical transmission and a two-phase pulse and a shutter pulse for horizontal transmission, and supplies the image sensor 113 with the pulses.

The image sensor 113 is configured from, for example, a solid-state image sensor such as a CCD (Charge Coupled Device) or a CMOS (Complementary Metal Oxide Semiconductor). The image sensor 113 is driven by an operation pulse from the timing generator 112, and performs photoelectric conversion of the image of subject-of-shooting guided through the imaging optical system 111. In this way, the image signal that represents the picked-up image is output to the signal processing section 114. The image signal that is output here is a signal which is synchronized with the operation pulse supplied from the timing generator 112, and is a RAW signal (raw signal) of a Bayer array including the three primary colors of red (R), green (G), and blue (B).

The image processing function of each section performed in the signal processing section 114 and after that may be realized by using a DSP (Digital Signal Processor), for example. The signal processing section 114 executes, to the image signal input from the image sensor 113, image signal processing such as noise reduction, white balance adjustment, color correction, edge reinforcement, gamma correction, and resolution conversion. The signal processing section 114 may temporarily store a digital image signal in the memory 103. The RAW/YC conversion section 115 converts the RAW signal input from the signal processing section 114 into a YC signal, and outputs the YC signal to the motion compensation section 116. Here, the YC signal is an image signal including a luminance component (Y) and a red/blue color-difference component (Cr/Cb).

The motion compensation section 116 loads an image signal of a target image and an image signal of a reference image from the memory 103. The motion compensation section 116 estimates a motion vector between those images by processing such as block matching, and compensates the motion between the target image and the reference image. As will be described later, the motion compensation section 116 may provide the color-difference NR section 118 with image data of a reduced frame matching processing range used for the process of estimating the motion vector.

The image compositing section 117 composites the target image and the reference image, the motion therebetween having been compensated by the motion compensation section 116, and generates an NR image which is a composited image. The image compositing section 117 provides the color-difference NR section 118 with the NR image. In the NR image, the noise included in the image is reduced owing to the effect achieved by the frame NR described above. Note that the details of the motion compensation section 116 and the image compositing section 117 will be described below.

The color-difference NR section 118 performs spatial filtering of the NR image provided by the image compositing section 117. The color-difference NR section 118 may perform spatial filtering of the NR image using an ∈-filter. By performing spatial filtering, a noise component having a low spatial frequency included in the NR image may be removed. The color-difference NR section 118 may perform spatial filtering of the color-difference component included in the YC signal of the NR image. The color-difference NR section 118 may acquire, from the motion compensation section 116, the image data of the reduced frame matching processing range used for the process of estimating the motion vector. The image signal output from the color-difference NR section 118 may temporarily be stored in the memory 103. Note that the details of the color-difference NR section 118 will be described below.

In the case where an instruction to shoot a still image is acquired by the operation section 102 (at the time of shooting the still image), the still image codec 119 loads from the memory 103 the image signal obtained after the NR processing, compresses the image signal with a predetermined compression coding system such as JPEG (Joint Photographic Experts Group), and stores the compressed image signal in the storage 104 as image data. Further, in the case where an instruction to reproduce the still image is acquired by the operation section 102 (at the time of reproducing the still image), the still image codec 119 may load the image data from the storage 104, and may provide the NTSC encoder 121 with the image signal expanded with a predetermined compression coding system such as JPEG.

In the case where an instruction to shoot a moving image is acquired by the operation section 102 (at the time of shooting the moving image), the moving image codec 120 loads from the memory 103 the image signal obtained after the NR processing, compresses the image signal with a predetermined compression coding system such as MPEG (Moving Picture Experts Group), and stores the compressed image signal in the storage 104 as image data. Further, in the case where an instruction to reproduce the moving image is acquired by the operation section 102 (at the time of reproducing the moving image), the moving image codec 120 may load the image data from the storage 104, and may provide the NTSC encoder 121 with the image signal expanded with a predetermined compression coding system such as MPEG.

The NTSC (National Television System Committee) encoder 121 converts the image signal into an NTSC system standard color video signal, and provides the display 122 with the NTSC system standard color video signal. At the time of shooting the still image or at the time of shooting the moving image, the NTSC encoder 121 may load from the memory 103 the image signal obtained after the NR processing, and may provide the display 122 with the image as a through image or a shot image. Further, at the time of reproducing the still image or at the time of reproducing the moving image, the NTSC encoder 121 may acquire the image signal from the still image codec 119 or the moving image codec 120, and may provide the display 122 with the image signal as a reproduced image.

The display 122 displays a video signal acquired from the NTSC encoder 121. The display 122 may be, for example, an LCD (Liquid Crystal Display) or an organic EL (Electro-Luminescence) display. Further, the video signal output from the NTSC encoder 121 may be output to an outside from the imaging device 100, using a communication section such as an HDMI (High-Definition Multimedia Interface), which is not shown.

1-2. About Frame NR Processing

Next, frame NR processing according to the first embodiment of the present disclosure will be described. In the imaging device 100 according to the present embodiment, the frame NR processing is mainly executed by the motion compensation section 116 and the image compositing section 117.

As described above, in the imaging device 100, the RAW signal generated by sensor coding performed by the image sensor 113 is converted into a YC signal by the RAW/YC conversion section 115. The frame NR is generally performed with respect to the RAW signal. However, for the frame NR with respect to the RAW signal, an extremely large amount of system resource within the imaging device 100 is used. Accordingly, in the present embodiment, the amount of system resource used for the frame NR is suppressed by performing the frame NR to the YC signal.

Figure 2:
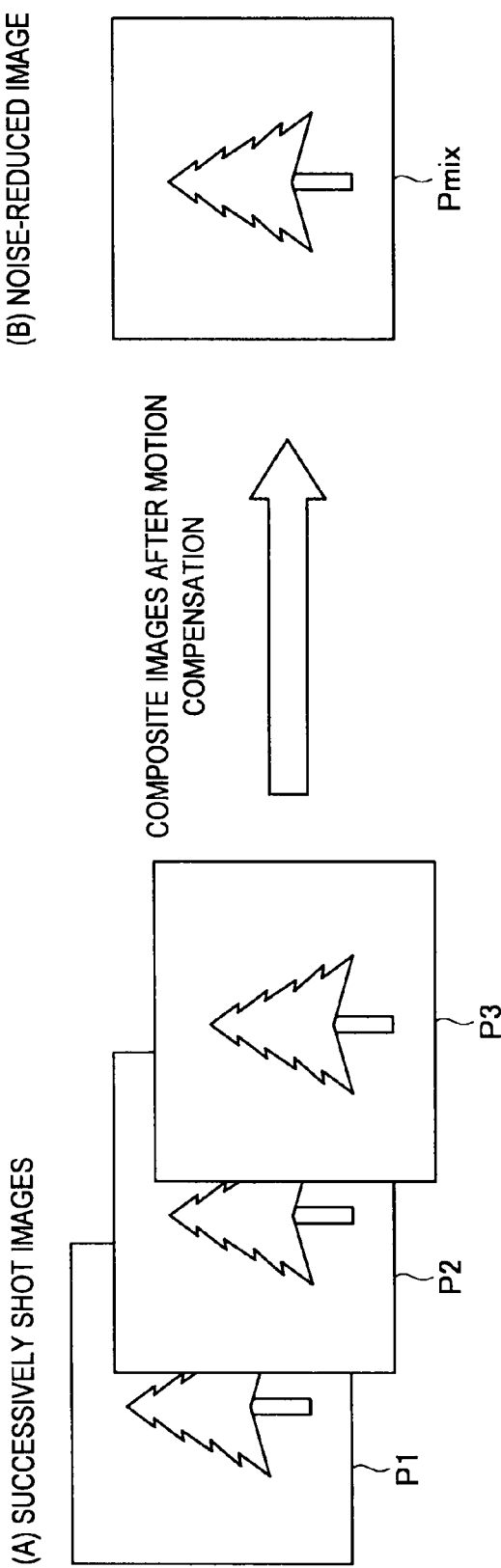
FIG. 2 is a conceptual diagram of frame NR processing according to the first embodiment of the present disclosure.

FIG. 2 is a conceptual diagram of frame NR processing according to the first embodiment of the present disclosure. Referring to FIG. 2, in the frame NR processing according to the present embodiment, successively-shot multiple images P1 to P3 are composited after being aligned (motion compensation), and form a noise-reduced image Pmix. Note that, as described above, the reason why the noise is reduced when the successively-shot multiple images are composited is that almost the same images are integrated in the time direction, and the noise randomly included in each image is cancelled out.

In the example shown in the figure, the multiple images P1 to P3 to be composited are not necessarily three images, and may be two images or four or more images. For example, in the case where the imaging device 100 according to the present embodiment shoots a still image, out of the multiple images which are successively shot at high speed, the first image may be used as a target image, and the second and the following images, which are used as reference images, may be composited on the target image. Further, in the case where the imaging device 100 shoots a moving image, images of successive frames which are sequentially shot may each be used as a target image, and onto those target images, the images of the frames that are immediately before the respective target images may be composited as reference images. That is, an image of a certain frame may be used as a target image, and may also be used as a reference image in the case of using an image of another frame as the target image.

In this way, in the processing of frame NR in which successively-shot images are composited, the alignment (motion compensation) between the target image and the reference image to be composited becomes important. In those images, there is a case where misregistration of an image occurs due to shaking of a shooter's hand, for example. Further, in each image, there is also a case where the misregistration occurs due to the movement of the subject-of-shooting itself. Accordingly, in the frame NR of the present embodiment, for each of multiple target blocks generated by dividing the target image, a motion vector on a per-block basis is estimated. In addition, for each block, motion compensation in which the motion vector on a per-block basis is reflected is performed, and then the target image and the reference image are composited.

Here, in the processing of estimating the motion vector on a per-block basis, there is used a block matching method, for each block (target block) of the target image, for searching for a block (motion compensation block) having the highest correlation therewith from among blocks (reference blocks) of the reference image. The motion vector on a per-block basis is determined as misregistration between the target block and the motion compensation block. The degree of correlation between the target block and the reference block may be evaluated using a SAD (Sum of Absolute Difference) value of luminance values of pixels within the respective blocks, for example.

Figure 3:
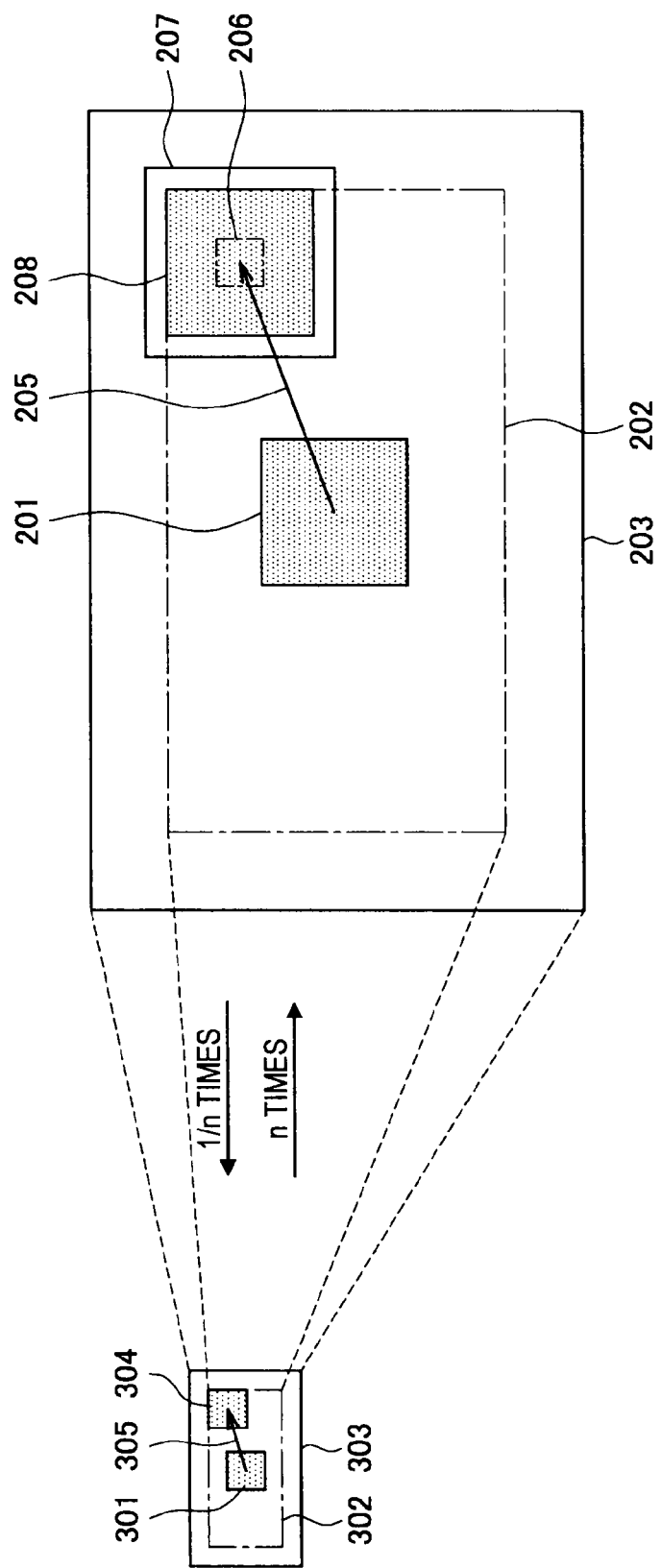
FIG. 3 is an explanatory diagram on motion vector estimation processing according to the first embodiment of the present disclosure.

FIG. 3 is an explanatory diagram on motion vector estimation processing according to the first embodiment of the present disclosure. Referring to FIG. 3, in the motion vector estimation processing according to the present embodiment, the motion vector on the reduced frame is estimated first, and, based on the result thereof, the motion vector on the base frame is estimated.

In the processing for estimating the motion vector on a per-block basis, the reference block having the minimum SAD value is specified as a motion compensation block. That is, in order to specify the motion compensation block, it is necessary to search for the reference block having the minimum SAD value, while sequentially moving the position of the reference block. For example, in the case of attempting to estimate the motion vector having an accuracy of 1 pixel, it is necessary that the motion compensation block be specified at an accuracy of 1 pixel, and therefore, also in searching for the reference block having the minimum SAD value, it is necessary that the reference block be sequentially moved by 1 pixel.

In the case where such reference block search is performed for the target image and the reference image as they are, the number of times of calculating the SAD values becomes too large, and the processing load increases. Accordingly, in the present embodiment, as shown in the example in the figure, images (reduced frames) obtained by reducing the respective target image and reference image are created, and based on the results obtained by estimating motion vectors on the reduced frames, motion vectors on the target image and the reference image (base frames), which are not reduced, are estimated.

Specifically, first, the target image and the reference image are each reduced to 1/n (n=2, 3, . . . ) in the horizontal direction and in the vertical direction, and a reduced frame target image and a reduced frame reference image are created. Accordingly, a base frame target block 201, and a search range 202 and a matching processing range 203 which are set based on the projection image of the base frame target block 201 on the reference image, are each reduced to 1/n, and are formed into a reduced frame target block 301, a reduced frame search range 302, and a reduced frame matching processing range 303, respectively.

Next, in the reduced frame reference image, the SAD value between multiple reduced frame reference blocks 304 set within a reduced frame matching processing range 303 and a reduced frame target block 301 is calculated, and thereby specifying, as a reduced frame motion compensation block, the block having the highest correlation with the reduced frame target block 301 among the reduced frame reference blocks 304. In addition, the misregistration between the reduced frame target block 301 and the reduced frame motion compensation block is acquired as a reduced frame motion vector 305.

Next, in a base frame reference image, a base frame temporary motion vector 205 obtained by multiplying the reduced frame motion vector 305 by n is defined. In addition, in the vicinity of the position moved in the direction and distance indicated by the base frame temporary motion vector 205 from the projection image of the base frame target block 201 on the base frame reference image, a base frame search range 206 and a base frame matching processing range 207 are set. Subsequently, the SAD value between multiple base frame reference blocks 208 set within the base frame matching processing range 207 and the base frame target block 201 is calculated, and thereby specifying, as a base frame motion compensation block, the block having the highest correlation with the base frame target block 201 among the base frame reference blocks 208. In addition, the misregistration between the base frame target block 201 and the base frame motion compensation block is acquired as a base frame motion vector.

Here, since the reduced frame reference image is reduced to 1/n compared to the base frame reference image, the accuracy of the reduced frame motion vector 305 is n times lower than the accuracy of the motion vector determined by a similar search performed on the base frame. For example, in the case of attempting to obtain the motion vector by searching for the motion compensation block by sequentially moving the reference block by 1 pixel, although the accuracy of the motion vector obtained in the search of the base frame is 1 pixel, the accuracy of the motion vector obtained in the search of the reduced frame is n pixel.

Therefore, in the present embodiment, the base frame search range 206 and the base frame matching processing range 207 are set on the base frame reference image based on the reduced frame motion vector 305 obtained in searching the reduced frame, and the searches of the motion compensation block and the motion vector are executed at a desired accuracy. Although the accuracy is lowered by n times, the range that the motion compensation block may be present is specified by the reduced frame motion vector 305. Accordingly, the range of the search performed on the base frame may be the base frame search range 206, which is much smaller than the original search range 202. For example, in the example shown in the figure, in the case of attempting to obtain a motion vector in unit of 1 pixel by the search of the base frame, the base frame search range 206 may have the range of n pixel(s) in the horizontal direction by n pixel(s) in the vertical direction.

In the motion vector estimation processing according to the present embodiment, the search of the motion compensation block in the entire original search range 202 is replaced with the search in the reduced frame search range 302. In this way, the number of times of calculating the SAD values of reference blocks is reduced to 1/n, for example, compared to the case where the calculation is executed with respect to the target image and the reference image as they are. Further, in the motion vector estimation processing according to the present embodiment, although an additional search in the base frame search range 206 is executed, the number of times of calculating the SAD values of reference blocks is not large in the additional search, since the base frame search range 206 represents a range much smaller than the original search range 202. Therefore, in the motion vector estimation processing according to the present embodiment, the processing load is reduced, compared to the case where the processing is executed with respect to the target image and the reference image as they are.

As has been described heretofore, in the frame NR processing according to the present embodiment, the noise of the image is reduced by compositing the successively-shot multiple images after the motion compensation. In the estimation of the motion vector for the motion compensation, the processing is executed with fewer loads, with the search using the reduced frame obtained by reducing the base frame.

(Advantage of NR Using Spatial Filtering)

However, as described above, all the noise included in an image is not necessarily the random noise, and there is also noise included as a fixed pattern in each image. Such fixed patterned noise occurs due to bias in sensor characteristics or lens characteristics, for example, and is a noise component having a low spatial frequency. Since such fixed patterned noise is not cancelled out even if successively-shot images are integrated in the time direction, it is difficult to be reduced by the frame NR.

Visual characteristics of the human eye are that it is not sensitive to a low spatial frequency noise component of luminance, but is sensitive to a low spatial frequency noise component of color difference. Therefore, in the case where the fixed patterned noise remains without being reduced by the frame NR, the fixed patterned noise can be observed as follows: the noise of luminance does not stand out; and the noise of color difference stands out. Accordingly, it can be considered that the fixed patterned noise is removed by spatial filtering such as lowpass filtering, bandpass filtering, or ε-filtering.

However, the spatial filtering more or less accompanies reduction in resolution. Visual characteristics of the human eye are that it is sensitive to the resolution of luminance, but is not sensitive to the resolution of color difference. Therefore, in the case where the spatial filtering is performed to a RAW signal or the like and the resolutions of the luminance and the color difference are both reduced, in the image after the spatial filtering, significant reduction in resolution is observed prominently, due to the fact that the resolution of luminance is particularly reduced.

Accordingly, in the present embodiment, the spatial filtering is performed to the YC signal including, in a separate manner, a luminance component and a color-difference component. In this way, the spatial filtering is not performed to the luminance component, and the spatial filtering is performed to the color-difference component. In this case, although the resolution of color difference is reduced, the resolution of luminance is not reduced. As described above, the visual characteristics of the human eye are that it is sensitive to the resolution of luminance, but is not sensitive to the resolution of color difference, and hence, in the image after the spatial filtering according to the present embodiment, significant reduction in resolution is not observed prominently.

The visual characteristics of the human eye related to the configuration of the spatial filtering according to the present embodiment described above are collectively shown in the following table.

|  | Luminance | Color difference |
| --- | --- | --- |
| Low spatial frequency noise | Not sensitive | Sensitive |
| Reduction in resolution | Sensitive | Not sensitive |

As in the present embodiment, in the case of reducing the noise included in the image using the frame NR and the spatial filtering in combination, the frame NR reduces the random noise of the entire spatial frequency band, and the spatial filtering reduces the fixed patterned noise having a low spatial frequency. In this case, as for the timing at which the spatial filtering is performed, there can be considered before the frame NR, after the frame NR, and the same time as the frame NR.

In the present embodiment, the spatial filtering is performed by the color-difference NR section 118 after the frame NR performed by the motion compensation section 116 and the image compositing section 117. This is because there is a case where the fixed patterned noise becomes rather apparent when successively-shot images are integrated in the time direction in the frame NR, and it is relatively easy to remove the apparent fixed patterned noise by spatial filtering. Further, this is also because, in the case of using a filter such as the ε-filter, which is used by setting a threshold, for the spatial filtering, when the random noise having a high spatial frequency is removed by the frame NR in advance, the setting of the threshold in the spatial filtering becomes easier.

1-3. Details of Frame NR Processing and Color-Difference NR Processing

Next, there will be described the details of frame NR processing and color-difference NR processing according to the first embodiment of the present disclosure, along with the detailed functions of the motion compensation section 116, the image compositing section 117, and the color-difference NR section 118.

(Details of Motion Compensation Section)

Figure 4:
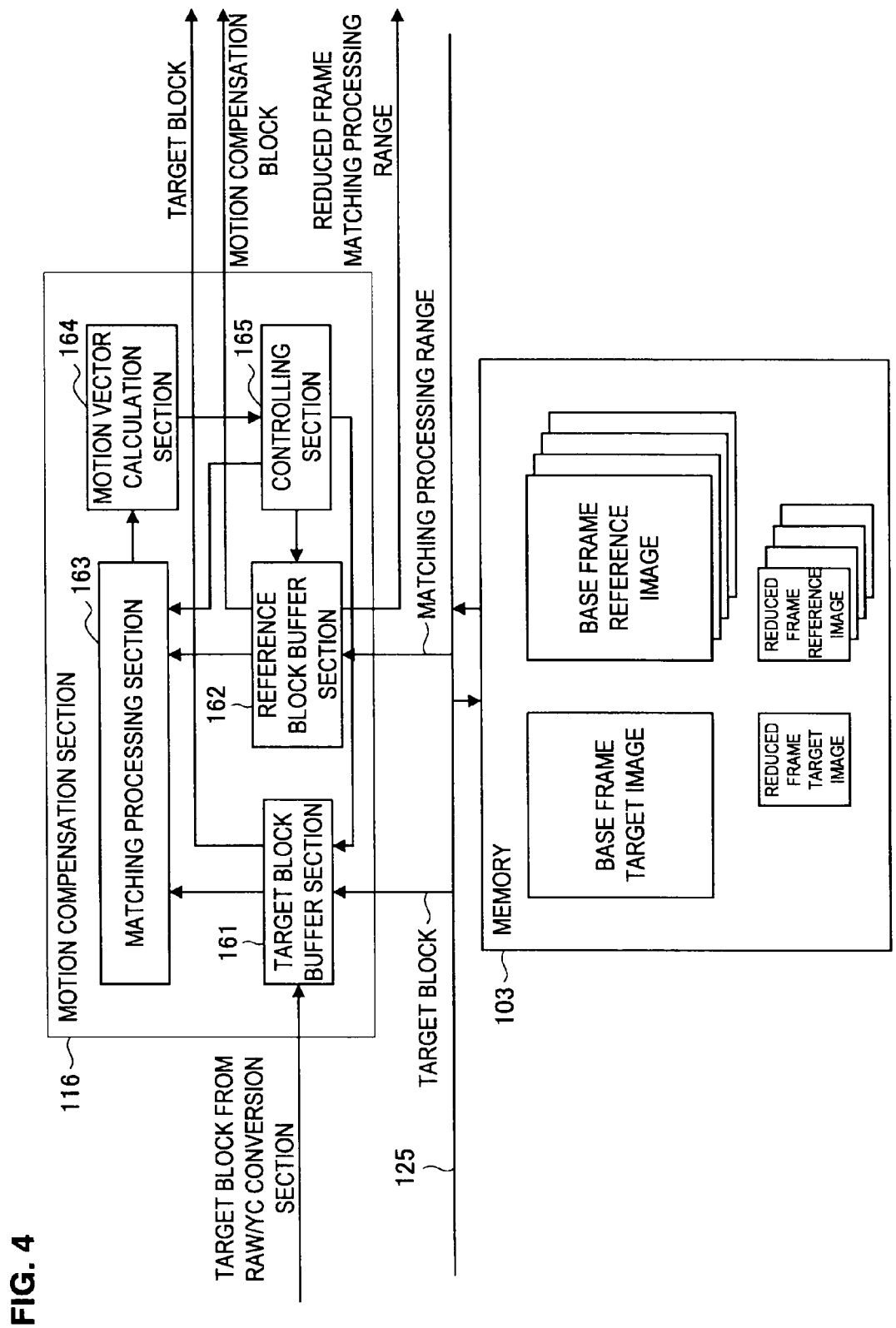
FIG. 4 is a block diagram showing a functional configuration of a motion compensation section of the imaging device according to the first embodiment of the present disclosure.

FIG. 4 is a block diagram showing a functional configuration of the motion compensation section 116 of the imaging device 100 according to the first embodiment of the present disclosure. Referring to FIG. 4, the motion compensation section 116 includes a target block buffer section 161, a reference block buffer section 162, a matching processing section 163, a motion vector calculation section 164, and a controlling section 165. The motion compensation section 116 including those sections may be realized using a DSP, for example.

Figure 5:
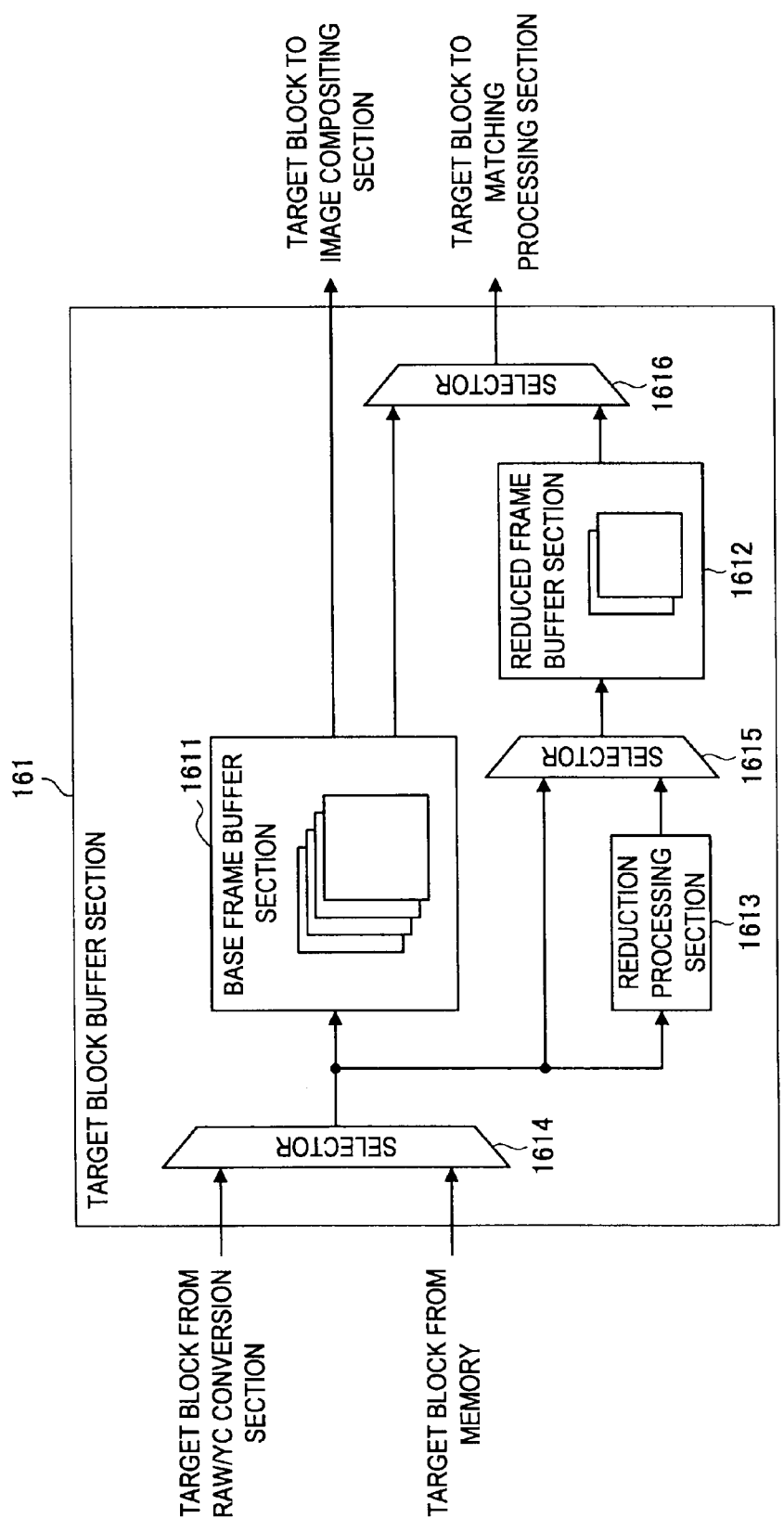
FIG. 5 is a block diagram showing a functional configuration of a target block buffer section included in the motion compensation section of the imaging device according to the first embodiment of the present disclosure.

Here, with reference to FIG. 5, the target block buffer section 161 will be described. FIG. 5 is a block diagram showing a functional configuration of the target block buffer section 161 included in the motion compensation section 116 of the imaging device 100 according to the first embodiment of the present disclosure. Referring to FIG. 5, the target block buffer section 161 includes a base frame buffer section 1611, a reduced frame buffer section 1612, and a reduction processing section 1613.

The target block buffer section 161 acquires pixel data of the base frame target block 201 or the reduced frame target block 301 provided by the memory 103 or the RAW/YC conversion section 115. The source from which those pieces of pixel data are acquired may be switched by a selector 1614. For example, the target block buffer section 161 may acquire the pixel data from the memory 103 when shooting a still image, and may acquire the pixel data from the RAW/YC conversion section 115 when shooting a moving image. Note that the pixel data of the reduced frame target block 301 acquired here may be generated by a reduced frame generation section 174 included in the image compositing section 117 to be described below or by the RAW/YC conversion section 115, and may be stored in the memory 103.

The target block buffer section 161 accumulates the pixel data of the base frame target block 201 in the base frame buffer section 1611. Further, the target block buffer section 161 accumulates the pixel data of the reduced frame target block 301 in the reduced frame buffer section 1612. For example, in the case where, at the time of shooting a moving image, the pixel data of the reduced frame target block 301 is not included in the pixel data acquired from the RAW/YC conversion section 115, the target block buffer section 161 uses the reduction processing section 1613 and generates the pixel data of the reduced frame target block 301 from the pixel data of the base frame target block 201. Whether or not to use the reduction processing section 1613 may be switched by a selector 1615.

The target block buffer section 161 provides the image compositing section 117 and the matching processing section 163 with the pixel data of the base frame target block 201 or the reduced frame target block 301. To the image compositing section 117, the pixel data of the base frame target block 201 accumulated in the base frame buffer section 1611 is provided. To the matching processing section 163, the pixel data of the reduced frame target block 301 accumulated in the reduced frame buffer section 1612 is provided at the time of block matching processing in the reduced frame, and the pixel data of the base frame target block 201 accumulated in the base frame buffer section 1611 is provided at the time of block matching processing in the base frame. The pixel data provided to the matching processing section 163 may be switched by a selector 1616.

Figure 6:
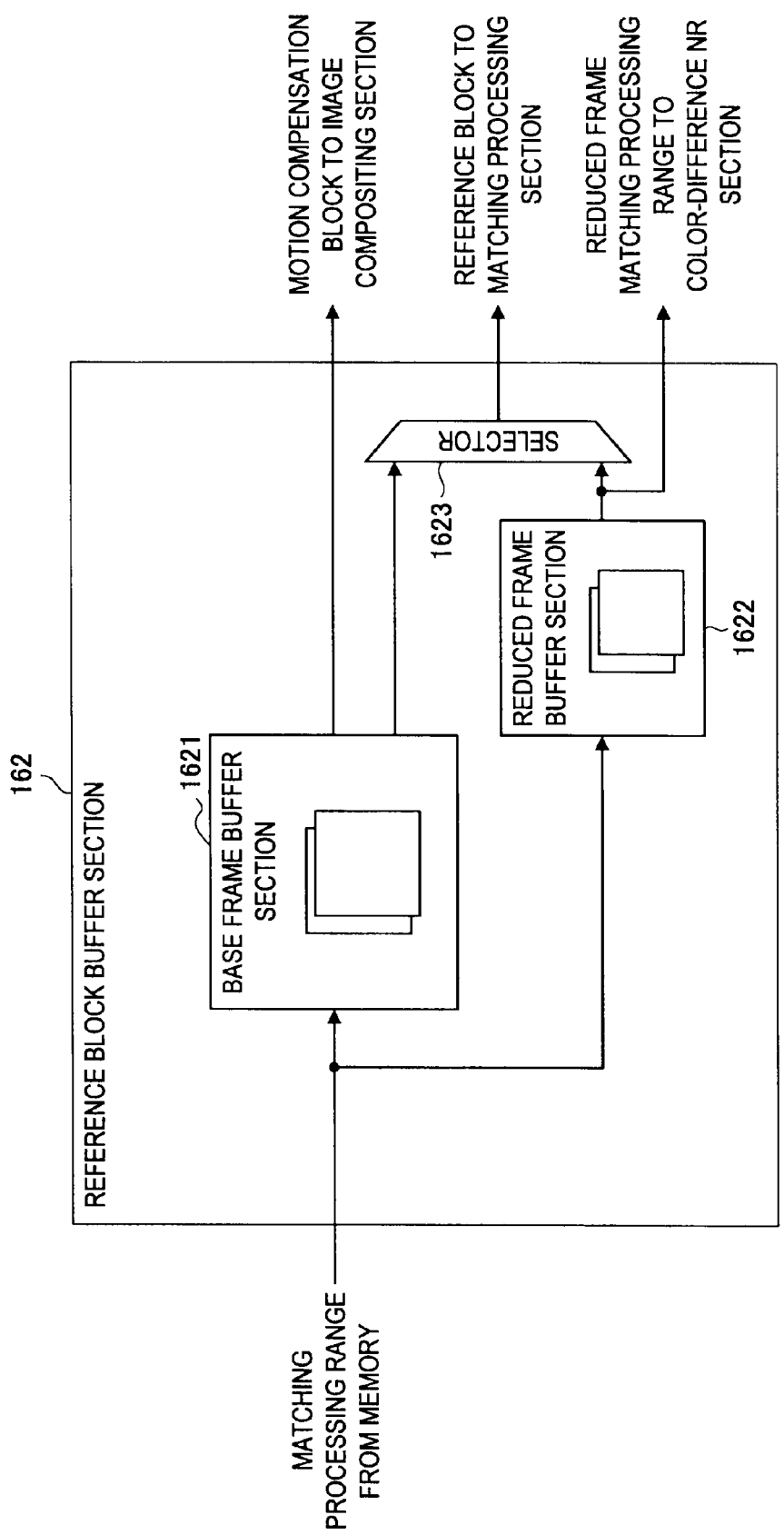
FIG. 6 is a block diagram showing a functional configuration of a reference block buffer section included in the motion compensation section of the imaging device according to the first embodiment of the present disclosure.

Next, with reference to FIG. 6, the reference block buffer section 162 will be described. FIG. 6 is a block diagram showing a functional configuration of the reference block buffer section 162 included in the motion compensation section 116 of the imaging device 100 according to the first embodiment of the present disclosure. Referring to FIG. 6, the reference block buffer section 162 includes a base frame buffer section 1621 and a reduced frame buffer section 1622.

The reference block buffer section 162 acquires, from the memory 103, the pixel data of the reduced frame matching processing range 303 and the pixel data of the base frame matching processing range 207. The pixel data of the reduced frame matching processing range 303 and the pixel data of the base frame matching processing range 207 that have been acquired are accumulated in the base frame buffer section 1621 and the reduced frame buffer section 1622, respectively.

Further, the reference block buffer section 162 provides the image compositing section 117 and the matching processing section 163 with the pixel data of the base frame or the reduced frame. To the image compositing section 117, out of the pieces of pixel data of the base frame matching processing range 207 accumulated in the base frame buffer section 1621, the pixel data of the range specified as a motion compensation block is provided. At the time of block matching processing in the reduced frame, out of the pieces of pixel data of the reduced frame matching processing range 303 accumulated in the reduced frame buffer section 1622, the pixel data of the reduced frame reference block used in the block matching processing is provided to the matching processing section 163. Further, at the time of block matching processing in the base frame, out of the pieces of pixel data of the base frame matching processing range 207 accumulated in the base frame buffer section 1621, the pixel data of the base frame reference block used in the block matching processing is provided to the matching processing section 163. Note that the pixel data provided to the matching processing section 163 is switched by a selector 1623.

In addition, the reference block buffer section 162 may also provide the color-difference NR section 118 with the pixel data of the reduced frame matching processing range 303 accumulated in the reduced frame buffer section 1622. As will be described below, the pixel data of the reduced frame matching processing range 303 provided here may be used as a window for spatial filtering processing in the color-difference NR section 118.

Refer to FIG. 4 again. The matching processing section 163 executes block matching processing for detecting strength of correlation between a target block and a reference block. The strength of correlation between the target block and the reference block may be evaluated using a SAD value of a luminance signal of each pixel, for example. The strength of correlation between the target block and the reference block may also be evaluated using another piece of information, such as a color-difference signal of each pixel. Further, in order to cut down the amount of operation, some of the pixels to be operated may be skipped.

The motion vector calculation section 164 acquires a motion vector based on the result obtained by the block matching processing performed in the matching processing section 163. The motion vector calculation section 164 detects and holds the minimum value of the SAD value calculated by the matching processing section 163, and in addition, may hold the SAD values of multiple reference blocks which are placed in the vicinity of the reference block having the minimum SAD value, and may estimate a motion vector with high sub-pixel accuracy by quadratic curve approximate interpolation processing, for example.

The controlling section 165 controls each section included in the motion compensation section 116. For example, the controlling section 165 controls the selectors 1614 to 1616 included in the target block buffer section 161, and the selector 1623 included in the reference block buffer section 162. Further, the controlling section 165 may also control the matching processing section 163 such that the block matching processing in the reduced frame or the base frame is executed based on the pixel data provided by the target block buffer section 161 and the reference block buffer section 162. In addition, the controlling section 165 may acquire a motion vector calculated by the motion vector calculation section 164, and based on the motion vector, may control the reference block buffer section 162 such that a motion compensation block is provided to the image compositing section 117.

(Details of Image Compositing Section)

Figure 7:
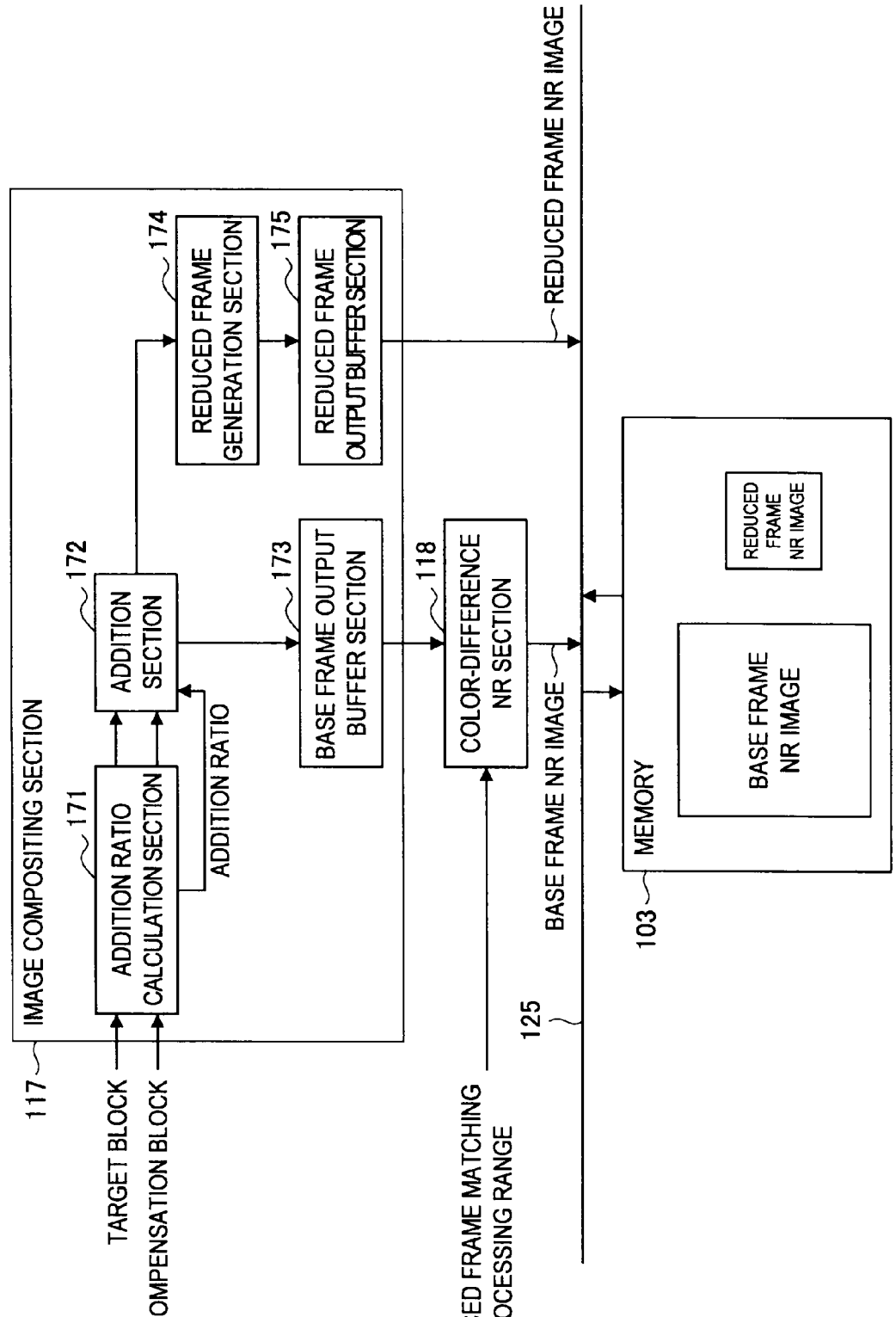
FIG. 7 is a block diagram showing a functional configuration of an image compositing section of the imaging device according to the first embodiment of the present disclosure.

FIG. 7 is a block diagram showing a functional configuration of the image compositing section 117 of the imaging device 100 according to the first embodiment of the present disclosure. Referring to FIG. 7, the image compositing section 117 includes an addition ratio calculation section 171, an addition section 172, a base frame output buffer section 173, a reduced frame generation section 174, and a reduced frame output buffer section 175. The image compositing section 117 including those sections may be realized using a DSP, for example.

The addition ratio calculation section 171 acquires the pixel data of a base frame target block and the pixel data of a motion compensation block from the motion compensation section 116, and calculates the addition ratio of those blocks. The addition may be performed to the base frame target block 201 and the motion compensation block using an addition method such as a simple addition method or an average addition method. The addition ratio calculation section 171 may calculate the addition ratio in accordance with the addition method. The addition ratio calculation section 171 provides the addition section 172 with the calculated addition ratio, the pixel data of the base frame target block 201, and the pixel data of the motion compensation block.

The addition section 172 acquires, from the addition ratio calculation section 171, the pixel data of the base frame target block, the pixel data of the motion compensation block, and the addition ratio of those blocks. The addition section 172 adds the pixel data of the base frame target block to the pixel data of the motion compensation block at the acquired addition ratio, thereby generating a base frame NR block with reduced noise owing to an advantageous effect of the frame NR. The addition section 172 provides the base frame output buffer section 173 and the reduced frame generation section 174 with the pixel data of the base frame NR block.

The base frame output buffer section 173 accumulates the pixel data of the base frame NR block provided by the addition section 172, and provides the color-difference NR section 118 with the pixel data of the base frame NR block as a base frame NR image.

The reduced frame generation section 174 reduces the pixel data of the base frame NR block provided by the addition section 172, and generates pixel data of a reduced frame NR block. The reduced frame generation section 174 provides the reduced frame output buffer section 175 with the pixel data of the reduced frame NR block.

The reduced frame output buffer section 175 accumulates the pixel data of the reduced frame NR block provided by the reduced frame generation section 174, and stores in the memory 103 the pixel data of the reduced frame NR block as a reduced frame NR image. Here, the reduced frame NR image stored in the memory 103 may be used as a reduced frame target image, in the case where a reference image is further composited with the target image obtained after the frame NR at the time of shooting a still image, for example. Further, here, the reduced frame NR image stored in the memory 103 may be used as a reduced frame reference image, in the case where the frame NR is executed using the next frame as a target image at the time of shooting a moving image.

(Details of Color-Difference NR Section)

Figure 8:
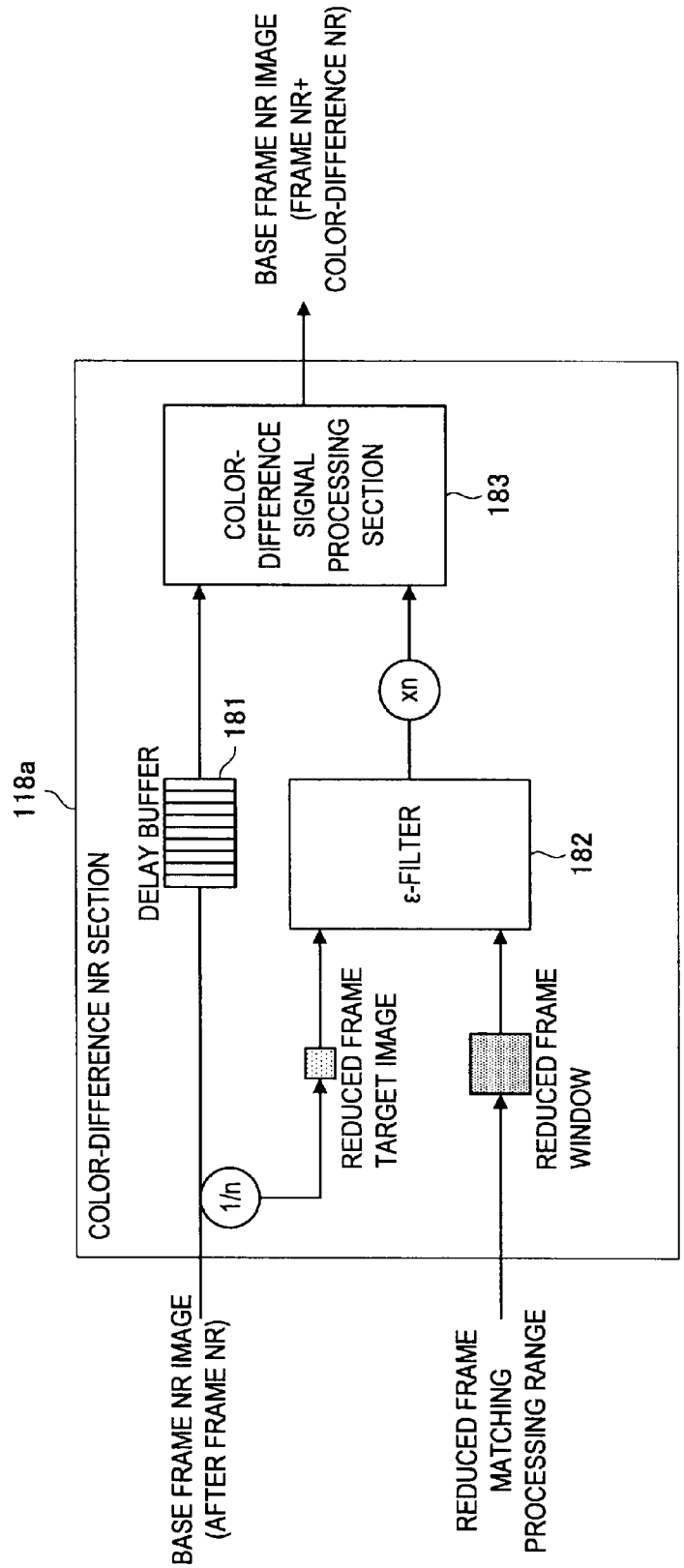
FIG. 8 is a block diagram showing a functional configuration of a color-difference NR section of the imaging device according to the first embodiment of the present disclosure.

FIG. 8 is a block diagram showing a functional configuration of a color-difference NR section 118a of the imaging device 100 according to the first embodiment of the present disclosure. Referring to FIG. 8, the color-difference NR section 118a includes a delay buffer 181, an ε-filter 182, and a color-difference signal processing section 183. The color-difference NR section 118a including those sections may be realized using a DSP, for example.

The color-difference NR section 118a acquires, from the image compositing section 117, the pixel data of the base frame NR image obtained after the frame NR. The pixel data of the base frame NR image is a YC signal including a luminance component (Y) and a color-difference component (C). The pixel data of the base frame NR image is input to the delay buffer 181 on one hand, and is reduced to 1/n on the other hand. From the pixel data of the NR image reduced to 1/n, a reduced frame target image having a predetermined size is generated and is input to the ε-filter 182.

Further, the color-difference NR section 118a acquires the pixel data of the reduced frame matching processing range from the motion compensation section 116. The pixel data of the reduced frame matching processing range is also a YC signal including a luminance component (Y) and a color-difference component (C). The pixel data of the reduced frame matching processing range is input to the ε-filter 182 as a reduced frame window.

In the ε-filter 182, spatial filtering processing is executed to the color-difference component (C) included in the input YC signal. Here, the ε-filter is, in the case where the difference in pixel values between an attention pixel and a peripheral pixel thereof is equal to or less than a predetermined threshold, a spatial filter for replacing the pixel value of the attention pixel with the addition average of the pixel values of the attention pixel and the peripheral pixel. Note that such an ε-filter is described in detail in JP 2005-311455A, for example.

Further, as a substitute for the ε-filter 182, a spatial filter such as a lowpass filter or a bandpass filter can be used. However, in the present embodiment, since the random noise is already reduced by the frame NR in the base frame NR image to be a target of the spatial filtering, it is effective to use the ε-filter, which removes an isolated point using a threshold.

Further, as described above, the ε-filter 182 is used for removing fixed patterned noise having a low spatial frequency, which is difficult to be reduced by the frame NR. Therefore, it is desirable that the ε-filter 182 has a large tap number. The ε-filter having a large tap number is effective in removing a low spatial frequency noise. On the other hand, in the case where the setting of the threshold is too high, there occurs an adverse effect that a texture component of the image may also be removed. In the present embodiment, the random noise is already reduced by the frame NR in the base frame NR image to be a target of the spatial filtering. Therefore, in the ε-filter 182, the threshold can be set to a relatively low value. That is, in the present embodiment, even if an ε-filter having a large tap number is used as the ε-filter 182, the risk is small that the adverse effect that the texture component of the image may be removed.

Figure 9:
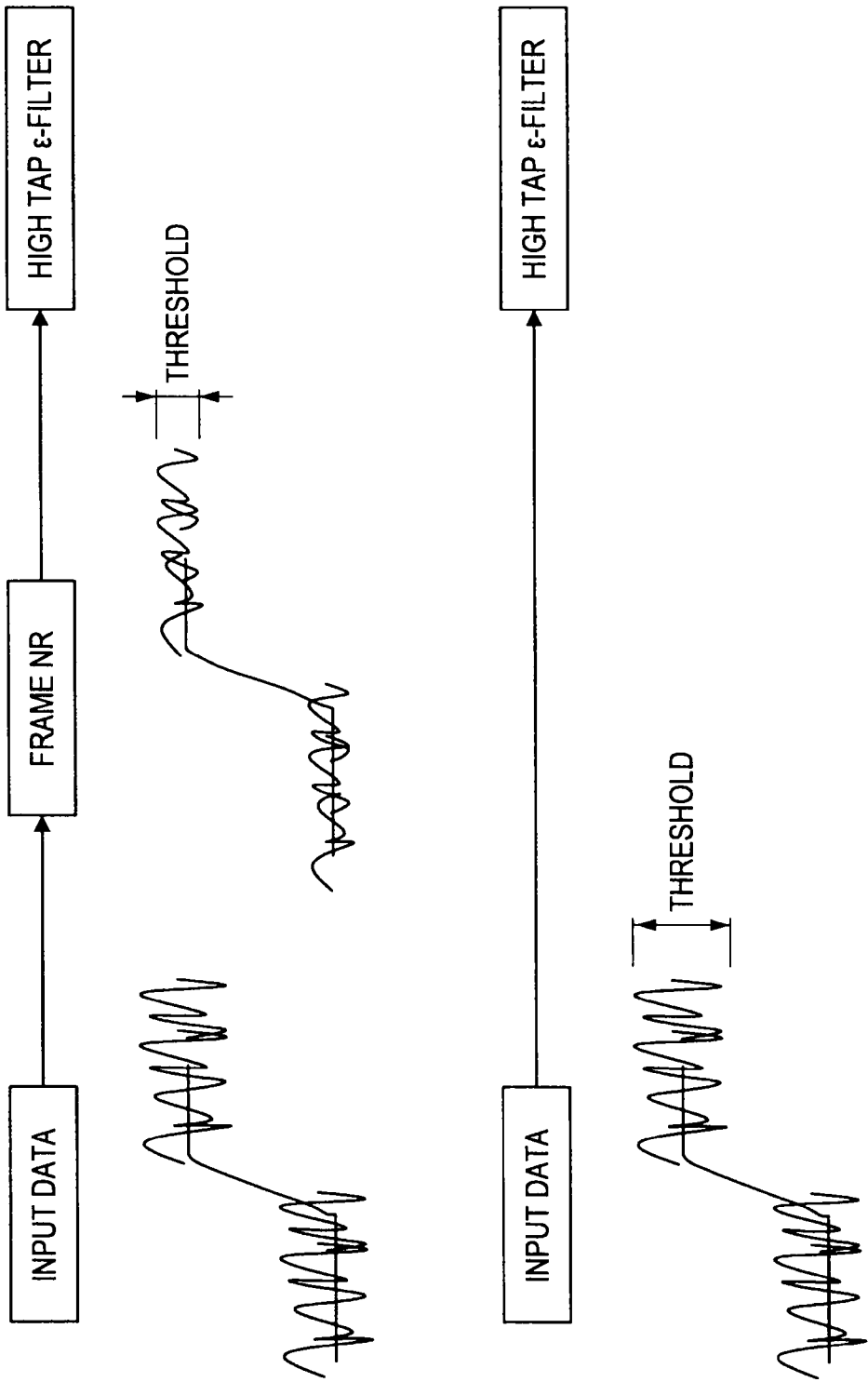
FIG. 9 is a schematic view for comparing a case in which a spatial filtering using an $\epsilon$ filter having a large tap number is performed after frame NR with a case in which the spatial filtering is performed without the frame NR.

As the present embodiment, an advantage of performing the spatial filtering using the ε-filter having a large tap number after the frame NR will be further described with reference to FIG. 9. FIG. 9 is a schematic view for comparing a case in which a spatial filtering using a (high-tap) ε filter having a large tap number is performed after frame NR with a case in which the spatial filtering is performed without the frame NR. Referring to FIG. 9, it is shown that, since the noise is reduced when the frame NR is added to the image signal of the input data, the threshold of the ε-filter to be set may be smaller than the case where the frame NR is not added.

The image signal in which the spatial filtering is performed to the color-difference component in the ε-filter 182 is enlarged n times, and is input to the color-difference signal processing section 183. The spatial filtering is performed using the ε-filter 182 in the state in which the size of the image is reduced to 1/n, and then the size is enlarged n times and is returned to its normal size, and it becomes possible to remove low spatial frequency noise of a wider range by using the ε-filter 182 having a limited window size.

On the other hand, the pixel data of the base frame NR image which is input to the delay buffer 181 is delayed for the processing of the spatial filtering using the ε-filter 182 and is input to the color-difference signal processing section 183. In the color-difference signal processing section 183, a color-difference component ($C_{CNR}$), to which the spatial filtering in the ε-filter is performed, is blended with a color-difference component ($C_{FNR}$) of the YC signal of the base frame NR image. For example, the color-difference component (C) of the base frame NR image after the blending may be represented as follows by using a coefficient "a".

$$C = a \times C_{CNR} + (1-a) \times C_{FNR}$$

In the case where "a" represents 1, the color-difference component ($C_{FNR}$) of the base frame NR image is replaced with the color-difference component ($C_{CNR}$) to which the spatial filtering using the ε-filter is performed. The pixel data of the base frame NR image output from the color-difference signal processing section 183 is stored in the memory 103.

(Advantages of Using Data of Reference Image)

In the color-difference NR section 118a according to the present embodiment, the pixel data of the reduced frame matching processing range provided by the motion compensation section 116 is used as the reduced frame window used in the ε-filter 182. As described above, the pixel data of the reduced frame matching processing range is acquired from the reduced frame reference image stored in the memory 103 for the block matching processing performed in the motion compensation section 116. Here, as described above, the reference images for the frame NR are images which are shot successively before or after the shooting of the target image. That is, in the color-difference NR section 118a according to the present embodiment, an image of a frame that is different from the reduced frame target image is used as the reduced frame window used in the ε-filter 182.

Such a configuration becomes available since the ε-filter 182 according to the present embodiment executes the spatial filtering using the image reduced to 1/n as a target. This is because, even if there is a minute change between the reduced frame target image and the reduced frame window which are used in the ε-filter 182, due to the difference in the frames, the influence to the spatial filtering is reduced to an extent that can be ignored since the change is further reduced to 1/n.

Figure 10:
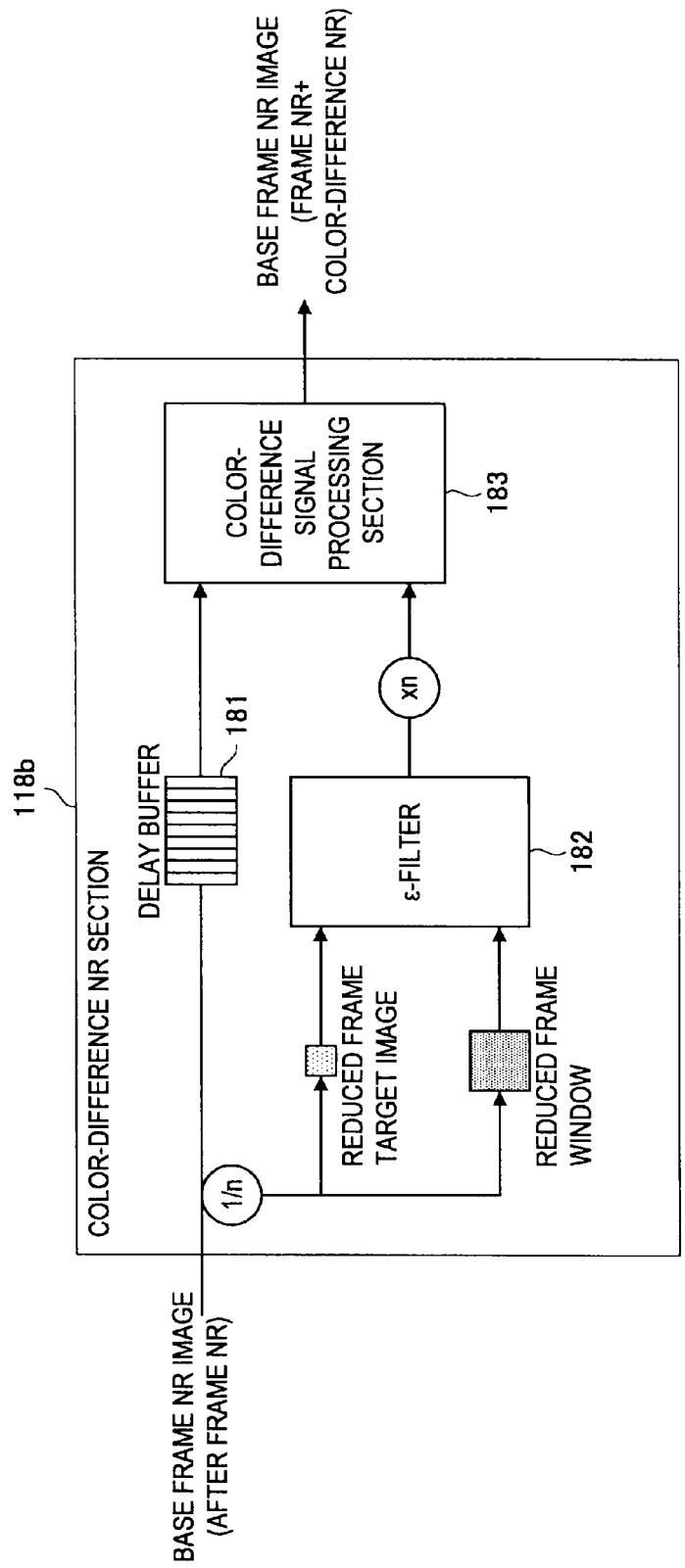
FIG. 10 is a block diagram showing a functional configuration of a color-difference NR section which does not use data of a reference image provided by the motion compensation section.

With reference to FIG. 10, there will be further described advantages of using data of the reference image provided by the motion compensation section 116 in this manner in the color-difference NR section 118a. FIG. 10 is a block diagram showing a functional configuration of a color-difference NR section 118b which does not use the data of the reference image provided by the motion compensation section 116.

The configuration of the color-difference NR section 118b is almost the same as that of the color-difference NR section 118a, but is different in that the reduced frame window to be input to the ε-filter 182 is generated by reducing the pixel data of the base frame NR image to 1/n. In the color-difference NR section 118b, in addition to reduction processing for generating a reduced frame target image, reduction processing for generating a reduced frame window having a size much larger than the size of the reduced frame target image is performed. In the image reduction processing, with increase in the size of the image to be generated, the amount of data to be held increases, and hence, a large amount of system resource is used. Accordingly, the amount of system resource used in the color-difference NR section 118b is much more than the amount of system resource used in the color-difference NR section 118a.

It is possible to remove, also by the configuration of the color-difference NR section 118b, the fixed patterned noise which is not removed by the frame NR. However, as the configuration of the color-difference NR section 118a, it becomes possible that, by using the data of the reference image provided by the motion compensation section 116 as the window of the ε-filter, the size of the window of the ε-filter is increased while suppressing the usage of system resource and low spatial frequency noise of a wide range is effectively removed.

Note that the configuration in which the data of the reference image used for the motion compensation is used as a search window of the spatial filtering may be applied regardless of whether the reference image is used for the frame NR. That is, even in the case where the structural elements such as the motion compensation section 116 and the image compositing section 117 according to the present embodiment are not included, the above configuration can be applied. Further, the above configuration may be applied to cases where various types of spatial filtering in which the search window is used, and the types of the spatial filtering is not limited to the ε-filtering, and lowpass filtering, bandpass filtering, or the like can also be used.

(Summary of Frame NR Processing and Color-Difference NR Processing)

Figure 11:
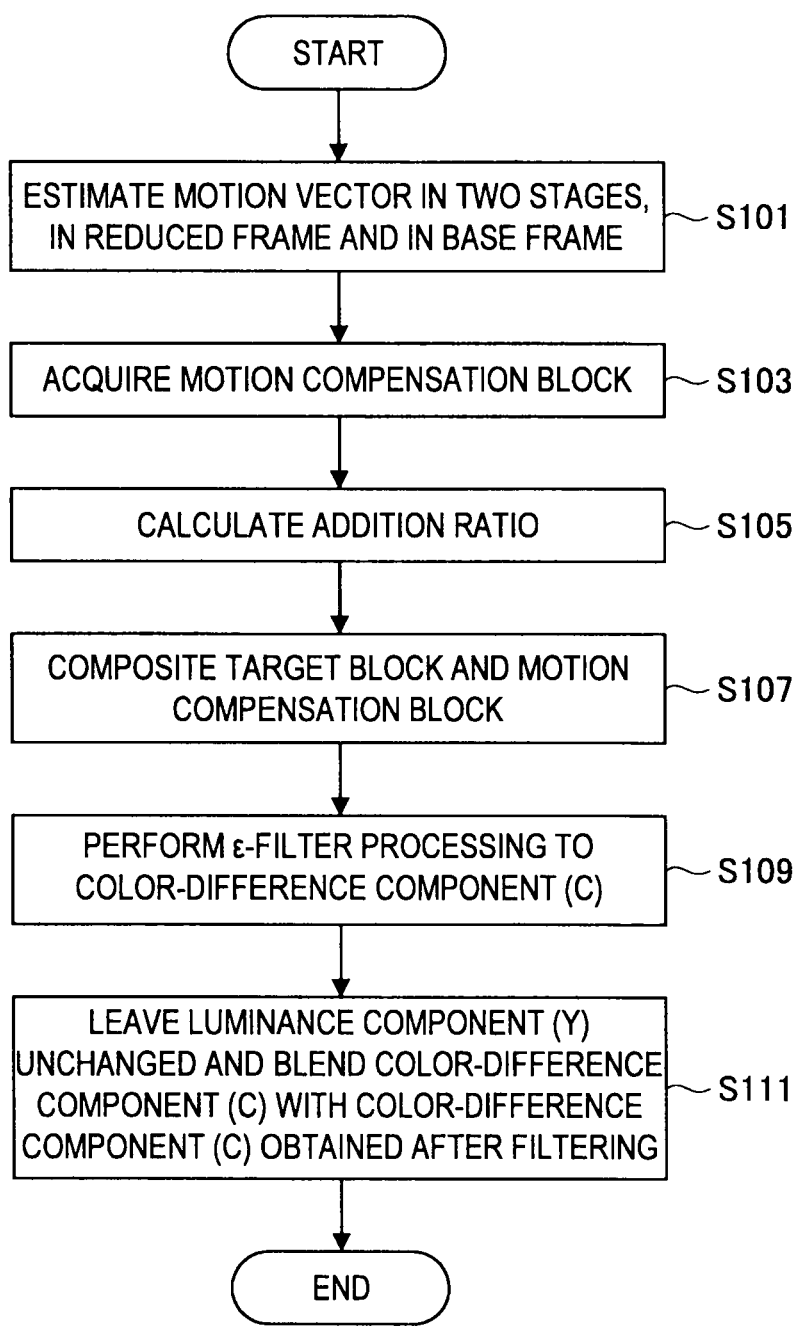
FIG. 11 is a flowchart showing the frame NR processing and color-difference NR processing according to the first embodiment of the present disclosure.

With reference to FIG. 11, the frame NR processing and the color-difference NR processing according to the present embodiment will be summarized. FIG. 11 is a flowchart showing the frame NR processing and the color-difference NR processing according to the first embodiment of the present disclosure.

First, in the motion compensation section 116, a motion vector on a per-block basis is estimated by the search using two stages, in the reduced frame and in the base frame (Step S101). Next, based on the estimated motion vector, a motion compensation block is acquired (Step S103). In addition, in the image compositing section 117, addition ratio of a target block to a motion compensation block is calculated (Step S105), and the target block and the motion compensation block are composited based on the addition ratio, (Step S107). In the processing so far, the frame NR processing is executed in which the target image and the reference image are motion-compensated and composited, and an NR image with reduced noise is obtained.

Subsequently, in the color-difference NR section 118, the spatial filtering using the ε-filter is performed to the color-difference component (C) included in the image signal of the NR image (Step S109). In addition, the luminance component (Y) included in the image signal of the NR image is not changed and is blended with the color-difference component (C) included in the image signal of the NR image, the color-difference component (C) having been subjected to the spatial filtering in Step S109 (Step S111). By the above processing, the fixed patterned noise having a low spatial frequency, which is difficult to be reduced by the frame NR, is removed, and as a result thereof, higher NR effects that supplement the effects of the frame NR can be obtained.

2. Second Embodiment

Subsequently, with reference to FIG. 12, a second embodiment of the present disclosure will be described. Note that, in comparison with the first embodiment, the second embodiment differs in the configuration of the color-difference NR section 118, but the other configurations are almost the same, and hence, the detailed descriptions thereof will be omitted.

Figure 12:
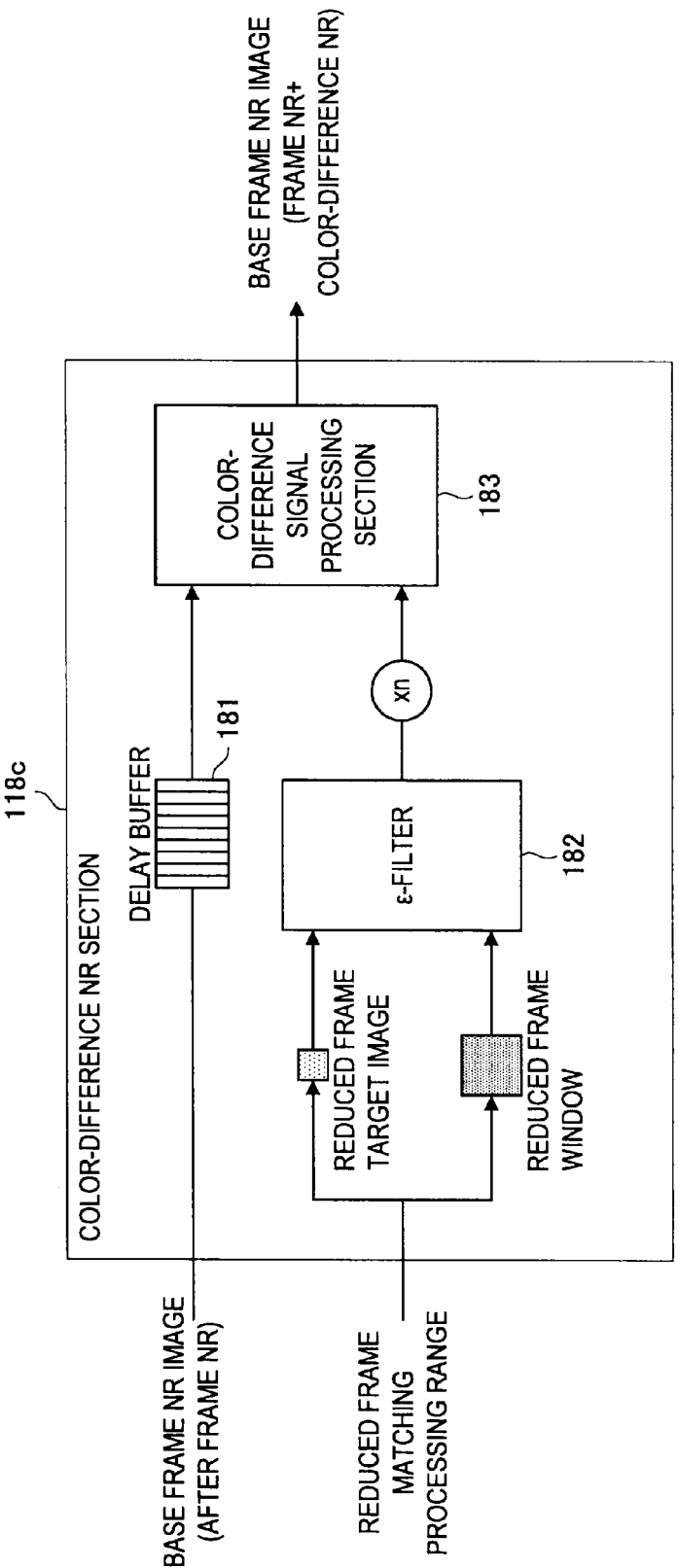
FIG. 12 is a block diagram showing a functional configuration of a color-difference NR section of an imaging device according to a second embodiment of the present disclosure.

FIG. 12 is a block diagram showing a functional configuration of a color-difference NR section 118c of an imaging device 100 according to the second embodiment of the present disclosure. Referring to FIG. 12, the color-difference NR section 118c includes a delay buffer 181, an ε-filter 182, and a color-difference signal processing section 183. The color-difference NR section 118c including those sections may be realized using a DSP, for example.

The color-difference NR section 118c according to the present embodiment differs from the color-difference NR section 118a according to the first embodiment in that, in addition to the reduced frame window, the reduced frame target image is also acquired from the pixel data of the reduced frame matching processing range provided by the motion compensation section 116. In the color-difference NR section 118c, the pixel data of the base frame NR image after the frame NR provided by the image compositing section 117 is input to the delay buffer 181, but is not used for generating a target image and a search window used in the ε-filter.

According to such a configuration of the color-difference NR section 118c, the target image and the search window used in the ε-filter 182 become the images of the same frame. Therefore, in the case where there is a large difference in the images between the target image and the reference image, the influence on the spatial filtering using the ε-filter 182 can be reduced.

3. Summary

In the embodiments of the present disclosure, the image processing device includes the motion compensation section which compensates the motion between the target image and the reference image, the image compositing section which generates the composited image by compositing the motion compensated target image and reference image, and the spatial filtering section which performs the spatial filtering of the composited image. According to such a configuration, the noise, which is difficult to be reduced by the processing of the frame NR in which images are composited, can be removed by the spatial filtering, and the effects of the noise reduction processing by compositing images can be further enhanced.

The spatial filtering section may perform the spatial filtering of the composited image using the ϵ-filter. According to such a configuration, the noise which has not been reduced by the processing of the frame NR can be effectively removed by the action of the isolated point-removal performed by the ϵ-filter using a threshold. Further, by using the ϵ-filter after the frame NR, the threshold of the ϵ-filter can be set low, and hence the setting of the threshold in the ϵ-filter becomes easier.

The spatial filtering section may reduce the composited image and perform the spatial filtering. According to such a configuration, low spatial frequency noise of a wider range can be removed by using the ϵ-filter having a limited window size, and hence, the spatial filtering effects of the ϵ-filter can be enhanced.

The image signal of the composited image is an image signal including a luminance component and a color-difference component, and the spatial filtering section may perform the spatial filtering of the color-difference component. Such a configuration can prevent the resolution of the luminance component from being lowered by the spatial filtering, and can make it difficult to cause the decrease in the resolution due to the spatial filtering to be perceived.

The image signal of the target image and the image signal of the reference image may each be an image signal including a luminance component and a color-difference component. According to such a configuration, the increase in system resource used for the compositing of images can be suppressed.

It should be understood by those skilled in the art that various modifications, combinations, sub-combinations and alterations may occur depending on design requirements and other factors insofar as they are within the scope of the appended claims or the equivalents thereof.

For example, in the embodiments described above, the imaging device is exemplified as the image processing device, but the present disclosure is not limited to such an example. For example, the image processing device may be an independent device that is used for processing image data which is being stored, or may be embedded, as an application for processing image data, in an information processing device such as a PC (Personal Computer).

Further, in the embodiments described above, the case has been exemplified in which the functions of the motion compensation section, the image compositing section, and the color-difference NR section included in the image processing device are each realized using the DSP, but the present disclosure is not limited to such an example. For example, the functions of the respective sections may each be realized by dedicated hardware, or may each be realized as software by using a CPU.

The present disclosure contains subject matter related to that disclosed in Japanese Priority Patent Application JP 2011-000348 filed in the Japan Patent Office on Jan. 5, 2011, the entire content of which is hereby incorporated by reference.

What is claimed is:

1. An image processing device comprising:
one or more processors being operable to:
compensate motion between a target image and a reference image, comprising:
obtaining a reduced frame target image and a reduced frame reference image by reducing size of the target image and the reference image;
estimating a motion vector between the reduced frame target image and the reduced frame reference image;
generate a composite image by compositing the target image and the reference image, the motion therebetween having been compensated based on the estimated motion vector, wherein the composite image comprises a luminance component and a color-difference component; and
perform spatial filtering of the color-difference component of the composite image.

2. The image processing device according to claim 1, wherein the one or more processors are operable to perform spatial filtering of the composite image by using an ϵ-filter.

3. The image processing device according to claim 1, wherein the spatial filtering reduces size of the composite image and performs spatial filtering on the reduced size of the composite image.

4. The image processing device according to claim 1, wherein an image signal of the target image and an image signal of the reference image are each an image signal comprising a luminance component and a color-difference component.

5. The image processing device according to claim 1, wherein the spatial filtering of the color-difference component of the composite image causes no reduction in resolution of the luminance component.

6. The image processing device according to claim 1, further comprising blending the luminance component with the spatially-filtered color-difference component of the composite image.

7. The image processing device according to claim 1, wherein the one or more processors are operable to perform spatial filtering of the composite image by using an ϵ-filter to remove fixed patterned noise in the composite image.

8. The image processing device according to claim 1, wherein the one or more processors are operable to acquire a motion compensation block based on the estimated motion vector.

9. The image processing device according to claim 8, wherein the motion compensation block for each target block of the target image is a block having highest correlation with the target block among reference blocks of the reference image.

10. The image processing device according to claim 8, wherein the one or more processors are operable to calculate an addition ratio of the target image and the motion compensation block based on pixel data.

11. The image processing device according to claim 1, wherein the one or more processors are operable to set a base frame search range and a base frame matching processing range on the reference image based on the estimated motion vector.

12. An image processing method comprising:
compensating motion between a target image and a reference image, comprising:
obtaining a reduced frame target image and a reduced frame reference image by reducing size of the target image and the reference image; and estimating a motion vector between the reduced frame target image and the reduced frame reference image;

generating a composite image by compositing the target image and the reference image, the motion therebetween having been compensated based on the estimated motion vector, wherein the composite image comprises a luminance component and a color-difference component; and performing spatial filtering of the color-difference component of the composite image.

13. The image processing method of claim 12, wherein the spatial filtering of the color-difference component of the composite image causes no reduction in resolution of the luminance component.

14. The image processing method of claim 12, further comprising blending the luminance component with the spatially-filtered color-difference component of the composite image.

15. The image processing method of claim 12, further comprising performing spatial filtering of the composite image by using an $\epsilon$-filter.

16. The image processing method of claim 15, wherein the spatial filtering of the composite image performed by the $\epsilon$-filter removes fixed patterned noise in the composite image.

17. A non-transitory computer readable medium, having stored thereon, a computer program having at least one code section executable by a computer, thereby causing the computer to perform the steps comprising:

compensating motion between a target image and a reference image, comprising:

obtaining a reduced frame target image and a reduced frame reference image by reducing size of the target image and the reference image; and estimating a motion vector between the reduced frame target image and the reduced frame reference image;

generating a composite image by compositing the target image and the reference image, the motion therebetween having been compensated, wherein the composite image comprises a luminance component and a color-difference component; and performing spatial filtering of the color-difference component of the composite image.

* * * * *